(12) United States Patent
Jakobi et al.

(10) Patent No.: US 9,133,861 B2
(45) Date of Patent: Sep. 15, 2015

(54) BRAKE SERVO

(75) Inventors: Ralf Jakobi, Flörsheim (DE); Albin Loew, Karben (DE); Sven Mainz, Eddersheim (DE); Stephan Becker, Badenheim (DE); Thomas Rössler, Amöneburg (DE); Horst Krämer, Ginsheim-Gustavsburg (DE); Uwe Kley, Frankfut/M. (DE); Wilfried Wagner, Hüttenberg (DE)

(73) Assignee: Continental Teves AG & Co. oHG (DE)

( * ) Notice: Subject to any disclaimer, the term of this patent is extended or adjusted under 35 U.S.C. 154(b) by 550 days.

(21) Appl. No.: 13/522,998

(22) PCT Filed: Feb. 1, 2011

(86) PCT No.: PCT/EP2011/051399
§ 371 (c)(1),
(2), (4) Date: Oct. 9, 2012

(87) PCT Pub. No.: WO2011/095482
PCT Pub. Date: Aug. 11, 2011

(65) Prior Publication Data
US 2013/0192456 A1   Aug. 1, 2013

(30) Foreign Application Priority Data

Feb. 2, 2010 (DE) .......................... 10 2010 001 510
Jan. 17, 2011 (DE) .......................... 10 2011 002 765

(51) Int. Cl.
*F15B 9/10* (2006.01)
*B60T 13/563* (2006.01)
(Continued)

(52) U.S. Cl.
CPC ................ *F15B 9/10* (2013.01); *B60T 13/563* (2013.01); *B60T 13/569* (2013.01); *B60T 13/72* (2013.01)

(58) Field of Classification Search
CPC ..... B60T 13/52; B60T 13/563; B60T 13/569; B60T 13/57
USPC ........................................... 91/376 R
See application file for complete search history.

(56) References Cited

U.S. PATENT DOCUMENTS

| 3,906,836 A | 9/1975 | Wilson |
| 4,641,568 A | 2/1987 | Boehm |

(Continued)

FOREIGN PATENT DOCUMENTS

| DE | 2345314 | 4/1974 |
| DE | 34 11 027 A1 | 9/1985 |

(Continued)

OTHER PUBLICATIONS

German Search Report for German Application No. 10 2011 002 765.3 dated Jul. 22, 2013.

(Continued)

*Primary Examiner* — Michael Leslie
(74) *Attorney, Agent, or Firm* — RatnerPrestia (57) ABSTRACT

A pneumatic brake servo for motor vehicles having a servo housing, the interior of which is divided into at least one working chamber and at least one vacuum chamber by at least one axially movable wall which can be loaded with a pneumatic differential pressure, having a control valve which controls the differential pressure and is arranged in a control housing for connecting the working chamber to the vacuum chamber or to atmosphere. The movable wall includes a diaphragm plate and a rolling diaphragm, and the working chamber is sealed by a sealing ring which bears against the control housing and which is clamped in the radial direction in relation to a longitudinal axis of the brake servo. An actively loaded area of the movable wall is reduced by division of the working chamber into a prechamber and a main chamber to avoid stick/slip effects and reduce disruptive noises.

7 Claims, 6 Drawing Sheets

(51) Int. Cl.
*B60T 13/569* (2006.01)
*B60T 13/72* (2006.01)

(56) References Cited

U.S. PATENT DOCUMENTS 5,024,304 A * 6/1991 Booten et al. ............... 91/376 R
5,031,507 A * 7/1991 Bornemann et al. ......... 91/376 R
5,095,805 A * 3/1992 Boehm et al. ............... 91/376 R

FOREIGN PATENT DOCUMENTS

DE          4014560    11/1991
DE       103 33 983 A1  2/2005
DE    10 2008 037 048 A1  5/2009

OTHER PUBLICATIONS

International Search Report for PCT International Application No. PCT/EP2011/051399 mailed Jul. 21, 2011.

* cited by examiner

BRAKE SERVO

CROSS REFERENCE TO RELATED APPLICATIONS

This application is the U.S. National Phase Application of PCT/EP2011/051399, filed Feb. 1, 2011, which claims priority to German Patent Application Nos. 10 2010 001 510.5, filed Feb. 2, 2010 and 10 2011 002 765.3, filed Jan. 17, 2011, the contents of such applications being incorporated by reference herein.

FIELD OF THE INVENTION

The invention relates to a pneumatic brake servo for motor vehicles having a servo housing, the interior of which is divided into at least one working chamber and at least one vacuum chamber by at least one axially movable wall which can be loaded with a pneumatic differential pressure, having a control valve which controls the differential pressure and is arranged in a control housing for connecting the working chamber to the vacuum chamber or to atmosphere, the movable wall comprising a diaphragm plate and a rolling diaphragm, and the working chamber being sealed by means of a sealing ring which bears against the control housing and which is clamped in the radial direction in relation to a longitudinal axis of the brake servo.

BACKGROUND OF THE INVENTION

Brake servos of the generic type are known, for example, from DE 103 33 983 A1 and DE 10 2008 037 048 A1, which are incorporated by reference, describing a conventional brake servo and DE 10 2008 037 048 A1 describing what is known as an active brake servo which can also be actuated by an electromagnet independently of an input member.

In modern vehicles, in particular, the automotive industry makes high requirements in relation to the acoustic comfort of the motor vehicle components. Said requirements cannot be met in part by way of the known brake servos. In tests, the provision of a high vacuum has proven to be a cause for disruptive noise emission. This occurs, inter alia, in the use of vacuum pumps which are necessary, in particular, in vehicles with an electric or hybrid drive, since no vacuum or insufficient vacuum can be provided by the motor/engine.

The high vacuum results in stick/slip effects and dynamic effects, in particular on the sealing ring for sealing the working chamber with respect to atmosphere, by way of which effects disruptive noises are produced.

It is therefore an aim of the invention to provide a brake servo, in which the described disadvantages can be avoided.

In order to achieve this, it is therefore proposed according to aspects of the invention that means are provided, in order, at the beginning of an actuation of the brake servo, to reduce an actively loaded area of the movable wall by division of the working chamber into a prechamber and a main chamber. As a result of the decrease in size of the working chamber in relation to the prechamber at the beginning of the actuation, a higher pressure difference is produced by way of the smaller, actively loaded area of the movable wall, which higher pressure difference ensures the sealing ring breaks free. Stick/slip effects and dynamic effects can therefore be avoided, and gentle starting up of the brake servo upon actuation can be realized.

In order to ensure complete restoring of the brake servo into a standby position, the means are preferably provided in a defined, leaky manner.

The means can be integrated into the known construction of a brake servo in a simple way without extensive modifications, by the means preferably being arranged circumferentially on the rolling diaphragm or the control housing, and by, at the beginning of the actuation, the means separating the main chamber from the prechamber in a defined, leaky manner by bearing against the servo housing or an intermediate floor.

One alternative embodiment of the invention provides that the means are arranged circumferentially on the servo housing, and that, at the beginning of the actuation, the means separate the main chamber from the prechamber in a defined, leaky manner by bearing against the rolling diaphragm.

A circumferential lip is preferably formed integrally as means on the rolling diaphragm, which circumferential lip bears against the servo housing or the intermediate floor at the beginning of actuation. Here, the lip can already be provided in a simple way during the production of the rolling diaphragm.

According to one advantageous development, in order not to endanger the functionality of the brake servo, at least one rib is provided on the circumferential lip, which rib ensures the defined leakiness of the lip. Here, a modification of the servo housing is advantageously not necessary.

One alternative, advantageous embodiment of the invention provides that the circumferential lip has at least one recess which ensures the defined leakiness of the lip, a modification of the servo housing not being necessary here either.

According to one advantageous embodiment of the invention, a reversibly deformable, circumferential filter element which ventilates the main chamber in a throttled manner at the beginning of the actuation can be provided as means.

At least one channel is preferably provided in the bearing region of the means, which channel ensures the defined leakiness of the means. Depending on the arrangement of the means, the channel can be provided on the servo housing or on the movable wall.

According to one advantageous embodiment, the filter element has at least one passage channel which ensures the defined leakiness of the filter element. No modification of the servo housing is necessary in this embodiment of the invention either.

One advantageous embodiment provides that the means are arranged in the region of an axial section of the servo housing, as a result of which the prechamber can be of small configuration at the beginning of the actuation.

According to a further advantageous embodiment of the invention, the means are arranged in the region of a radial flange section of the servo housing.

If, according to another advantageous embodiment, the means are arranged in the region of an oblique section of the servo housing, the brake servo can also have what is known as a tie rod.

BRIEF DESCRIPTION OF THE DRAWINGS

The invention is best understood from the following detailed description when read in connection with the accompanying drawing. Included in the drawings are the following figures.

In the drawing, in each case in longitudinal section.

DETAILED DESCRIPTION OF THE PREFERRED EMBODIMENTS

The servo housing 1 (indicated merely diagrammatically) of a known brake servo (shown in FIG. 1) of a motor vehicle brake system is divided into a working chamber 3 and a vacuum chamber 4 by an axially movable wall 2. The axially movable wall 2 consists of a diaphragm plate 8, which is deep drawn from sheet metal, and a flexible rolling diaphragm 18 which bears against said diaphragm plate 8 and forms a rolling diaphragm as a seal between the outer circumference of the diaphragm plate 8 and the servo housing 1 in a manner which is not shown in greater detail.

Figure 1:
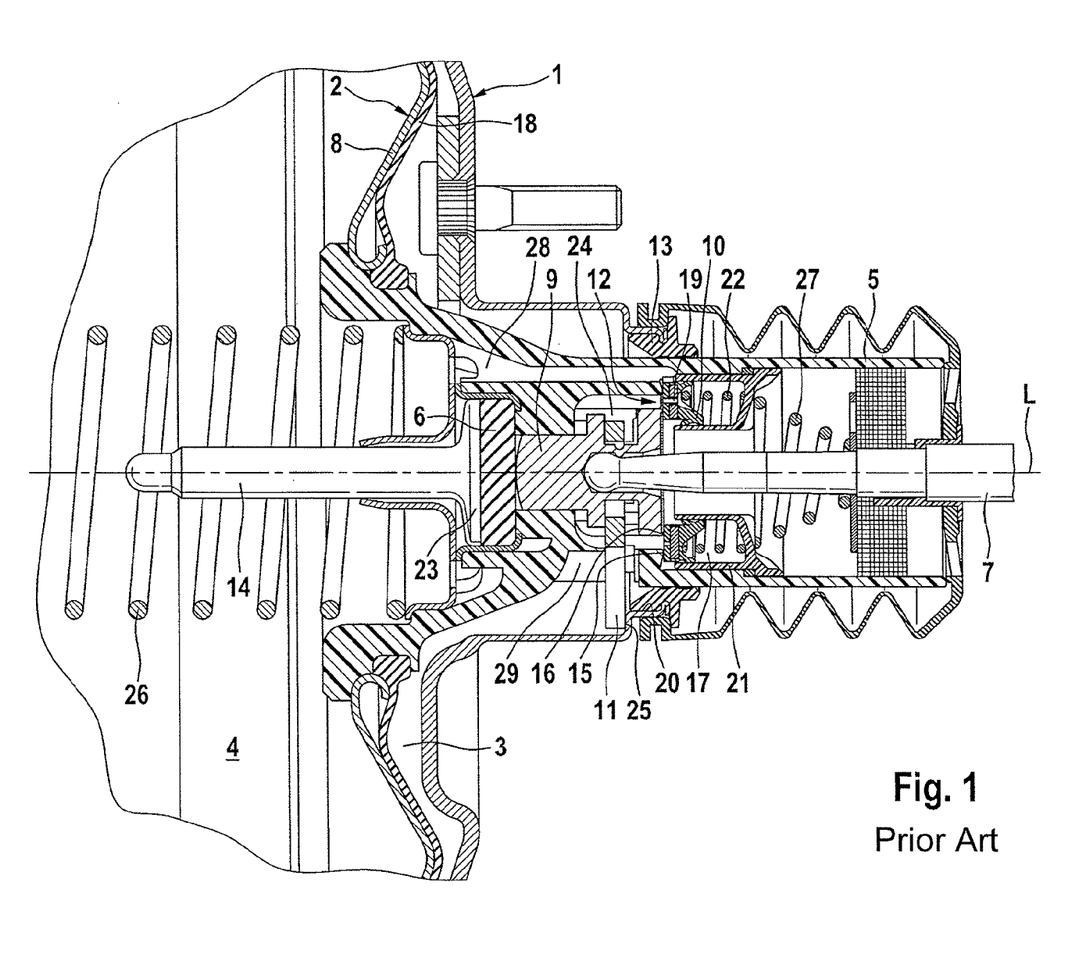
FIG. 1 shows a part view of a known pneumatic brake servo.

A control valve 12 which can be actuated by an input member 7 is accommodated in a control housing 5, which is guided in the servo housing 1 in a sealed manner and carries the movable wall 2, and consists of a first sealing seat 15 which is formed on the control housing 5, a second sealing seat 16 which is formed on a valve piston 9 which is connected to the input member 7, and a valve body 10 which interacts with the two sealing seats 15, 16 and is pressed against the valve seats 15, 16 by means of a valve spring 22 which is supported on a guide part 21. The working chamber 3 can be connected to the vacuum chamber 4 via a channel 28 which extends laterally in the control housing 5. The input member 7 is connected to a brake pedal (not shown).

The braking force is transmitted via an elastomeric reaction disk 6 which bears against the control housing 5 on the end side, and via a thrust rod 14 which has a head flange 23, to an actuating piston of a master cylinder (not shown) of the brake system, which actuating piston is attached to the vacuum-side end of the brake servo. The input force which is introduced at the input member 7 is transmitted to the reaction disk 6 by means of the valve piston 9.

A restoring spring 26 which is shown diagrammatically in the drawing and is supported on a flange (not shown) on the vacuum-side end wall of the servo housing 1 holds the movable wall 2 in the initial position which is shown. Moreover, a return spring 27 is provided which is arranged between the input member 7 and the guide part 21 and the force of which ensures a prestress of the valve piston 9 or its valve seat 16 with respect to the valve body 10.

In order for it to be possible to connect the working chamber 3 to atmosphere upon actuation of the control valve 12, finally an approximately radially extending channel 29 is formed in the control housing 5. Here, the return movement of the valve piston 9 at the end of a braking operation is delimited by a transverse member 11 which, in the released position of the brake servo which is shown, bears against a stop 25 which is formed on the servo housing 1.

In order to seal the working chamber 3 with respect to atmosphere, a sealing ring 13 is arranged in a housing opening 20 of the servo housing 1, which housing opening 20 is provided for receiving the control housing 5, said sealing ring 13 bearing against the control housing 5 and being clamped in the radial direction in relation to a longitudinal axis L of the brake servo. The sealing ring 13 ensures the sealing action of the working chamber 3 and at the same time makes a stroke movement (indicated by an arrow) of the control housing 5 possible in the case of a brake actuation.

A pneumatic cavity 17 is delimited in the control housing 5, which pneumatic cavity 17 connect the pneumatic cavity 17 via passages 19 in the valve body 22 to an annular space 24 which is delimited by the sealing seats 15, 16 and in which the abovementioned pneumatic channel 29 opens, with the result that the pneumatic cavity 17 is connected permanently to the working chamber 3 and a pressure equalization operation takes place at the valve body 10.

The method of operation and the principal design of the exemplary embodiments of the invention which are described in the following text do not differ from the method of operation and the principal design of the known brake servo which is described in FIG. 1, with the result that only parts which are essential for the invention will be shown and described in the following text. Here, identical components are provided with identical designations and will no longer be described in the following text.

Details of exemplary embodiments of a brake servo according to the invention can be gathered from FIGS. 2 to 6, which brake servo can be configured as a single or tandem unit and as a conventional or what is known as an active brake servo which can also be actuated by an electromagnet independently of the input member 7.

In modern vehicles, in particular, the automotive industry makes very high requirements in relation to the acoustic comfort of the motor vehicle components. In the known brake servo which is described according to FIG. 1, said requirements cannot be met if, as has been shown in tests, a high vacuum is provided to the brake servo. This occurs, inter alia, in the use of vacuum pumps which are necessary, in particular, in vehicles with an electric or hybrid drive, since no vacuum or insufficient vacuum can be provided by the motor/engine.

The high vacuum results in stick/slip effects and dynamic effects, in particular on the sealing ring for sealing the working chamber, by way of which effects disruptive noises are produced.

In order to eliminate said disruptive noises, all the exemplary embodiments which are described in the following text have means, in order, at the beginning of an actuation of the brake servo, to reduce an actively loaded area of the movable wall 2, 39 by division of the working chamber 3, 41 into a prechamber 30, 42 and a main chamber 31, 43.

As a result of the decrease in size of the working chamber 3 at the beginning of the actuation, a higher pressure difference is produced by way of the smaller, actively loaded area of the movable wall 2, 39, which higher pressure difference ensures the sealing ring 13, 47 breaks free. Stick/slip effects and dynamic effects can therefore be avoided, and gentle starting up of the brake servo upon actuation can be realized.

Here, the means are advantageously provided in a defined, leaky manner, in order to make a complete return of the brake servo into a standby position possible.

A common feature of the first three exemplary embodiments is that a circumferential lip 32 which is formed integrally on the rolling diaphragm 18 and bears against the servo housing 1 at the beginning of the actuation is provided as means. Said lip 32 can already be produced in a simple way during the production of the rolling diaphragm 18 and can therefore be integrated into the known construction of the brake servo without extensive modifications.

In the standby position (shown in FIGS. 2 to 5) of the brake servo, the lip 32 bears against the servo housing 1 and therefore, at the beginning of the actuation separates the main chamber 31 from the prechamber 30, with the result that the working chamber 3 is reduced in size at the beginning of the actuation. A higher pressure difference can therefore be made possible by the smaller, actively loaded area of the movable wall 2, which pressure difference ensures that the sealing ring 13 breaks free and therefore that the brake servo starts up gently, as a result of which stick/slip effects and dynamic effects can be avoided.

When the movable wall 2 has traveled a short, defined path of, for example, approximately 1 mm, the lip 32 raises up from the servo housing 1 and the complete volume of the working chamber 3, that is to say prechamber 30 and main chamber 31, is available again.

Figure 2:
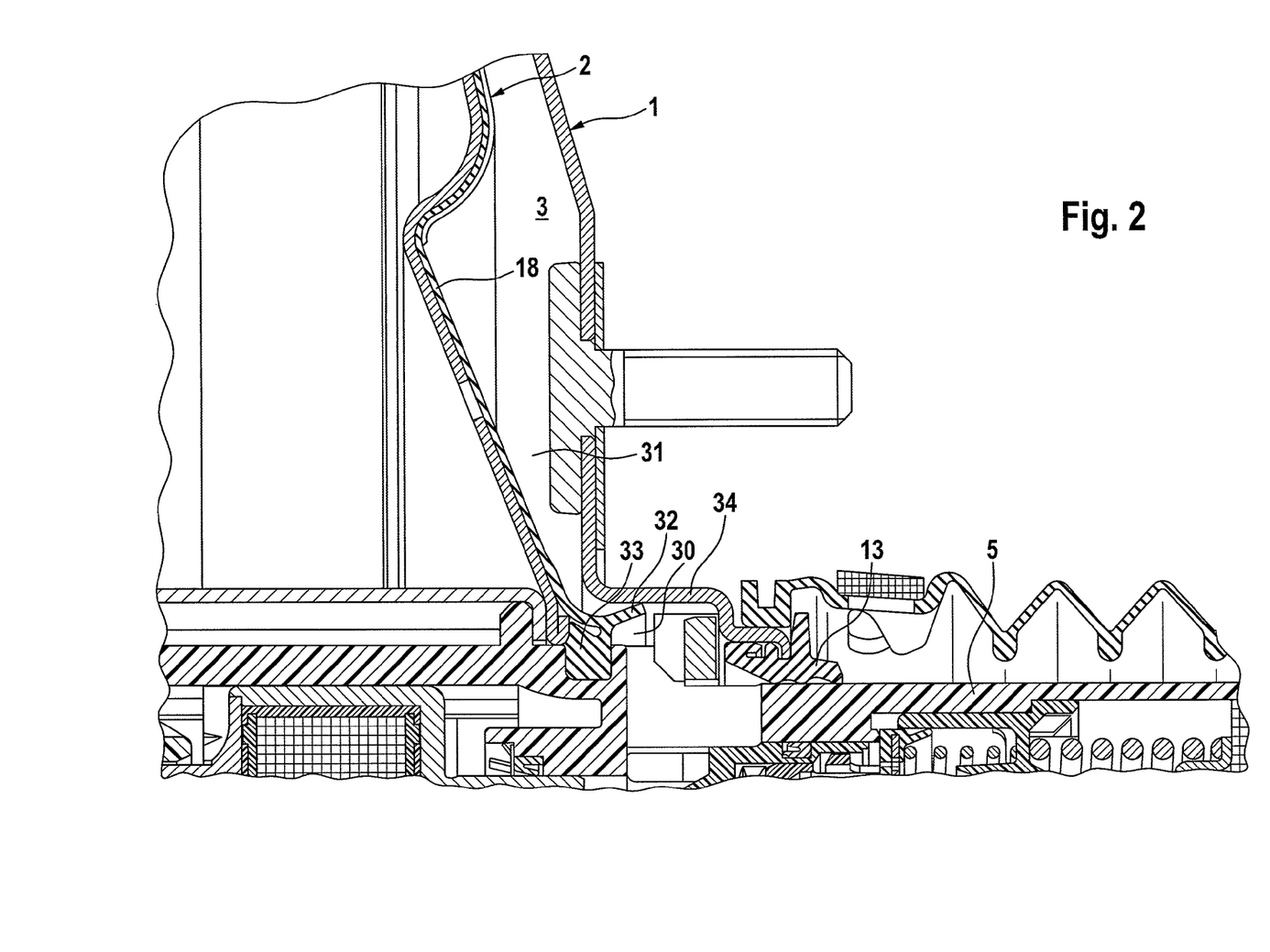
FIG. 2 shows a part view of a first exemplary embodiment of a pneumatic brake servo according to the invention.

The lip 32 of the first exemplary embodiment according to FIG. 2 is integrally formed directly onto a sealing bead 33 which is buttoned into the control housing 5, and bears against an axial section 34 of the servo housing 1 at the beginning of the actuation. As a result, the prechamber 30 can be configured to be as small as possible at the beginning of actuation. In an alternative embodiment (not shown), the lip 32 can also be arranged directly on the control housing 5.

Figure 3:
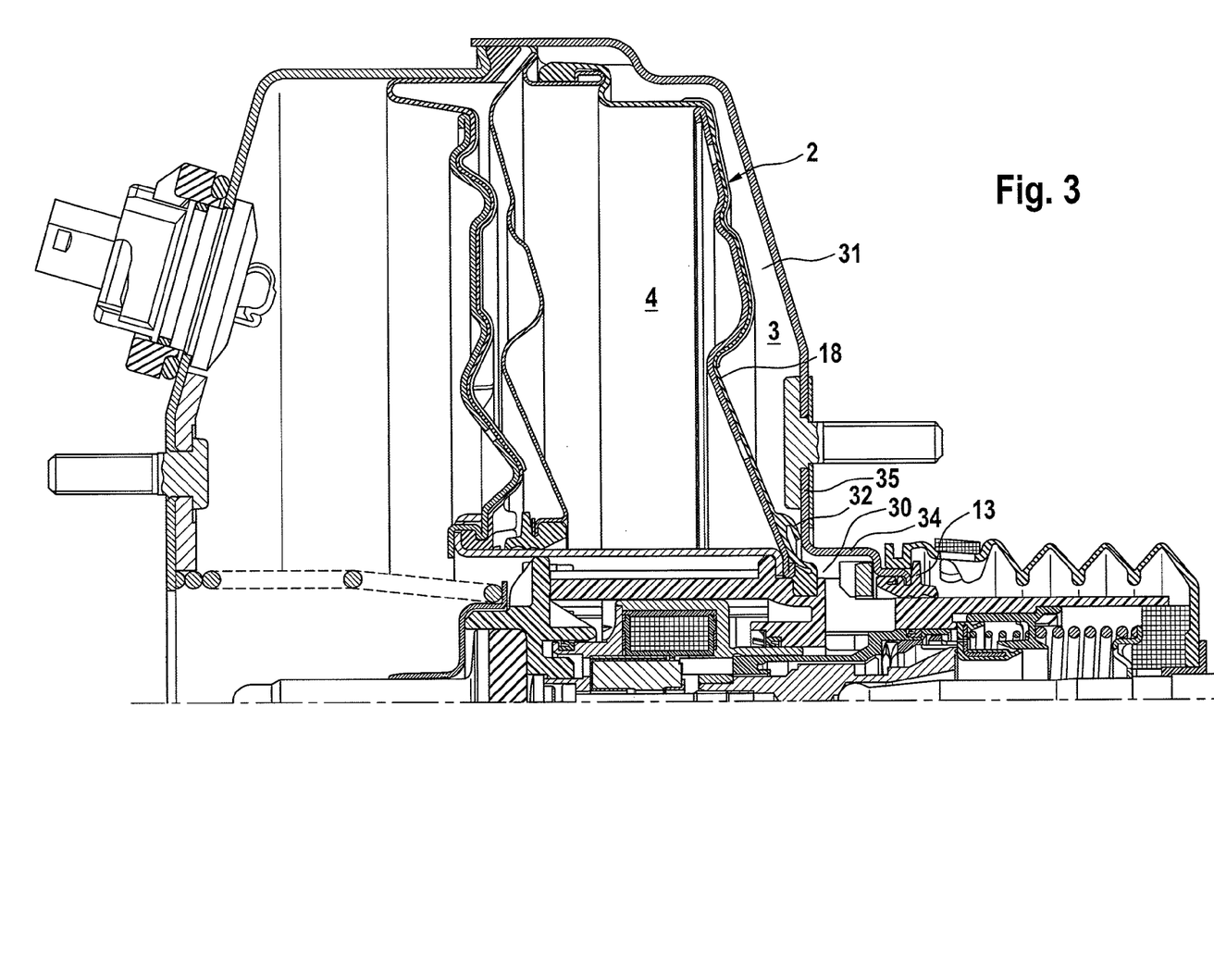
FIG. 3 shows a part view of a second exemplary embodiment of a pneumatic brake servo according to the invention.
Figure 4:
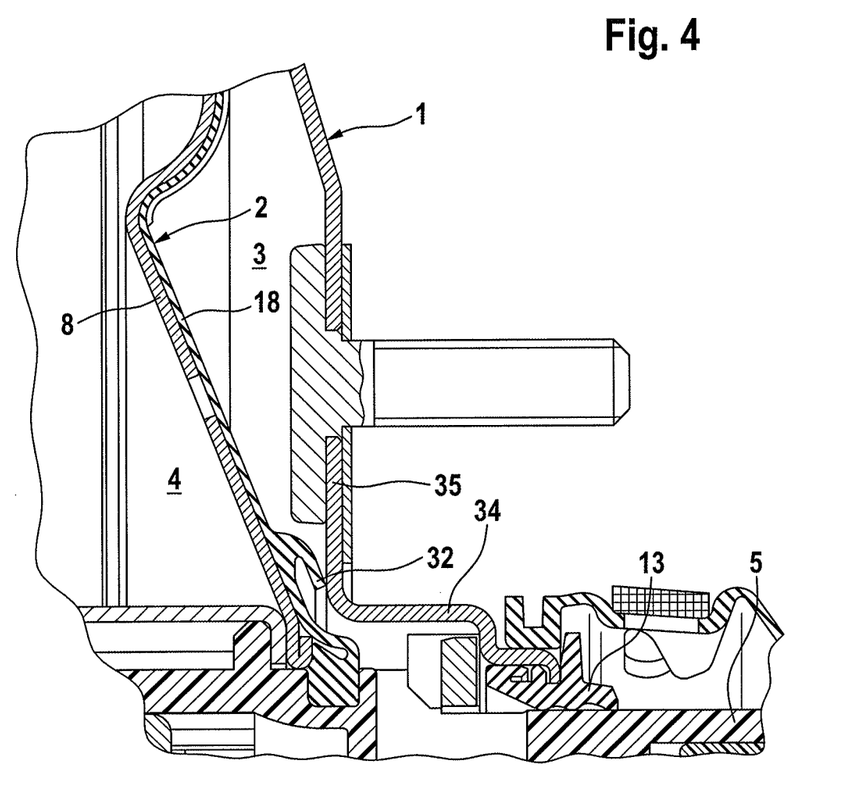
FIG. 4 shows an enlarged part view of the second exemplary embodiment according to FIG. 3.

In each case one detail of the second exemplary embodiment can be gathered from FIGS. 3 and 4. As can be seen herefrom, the lip 32 bears against a radial flange section 35 here at the beginning of actuation.

Figure 5:
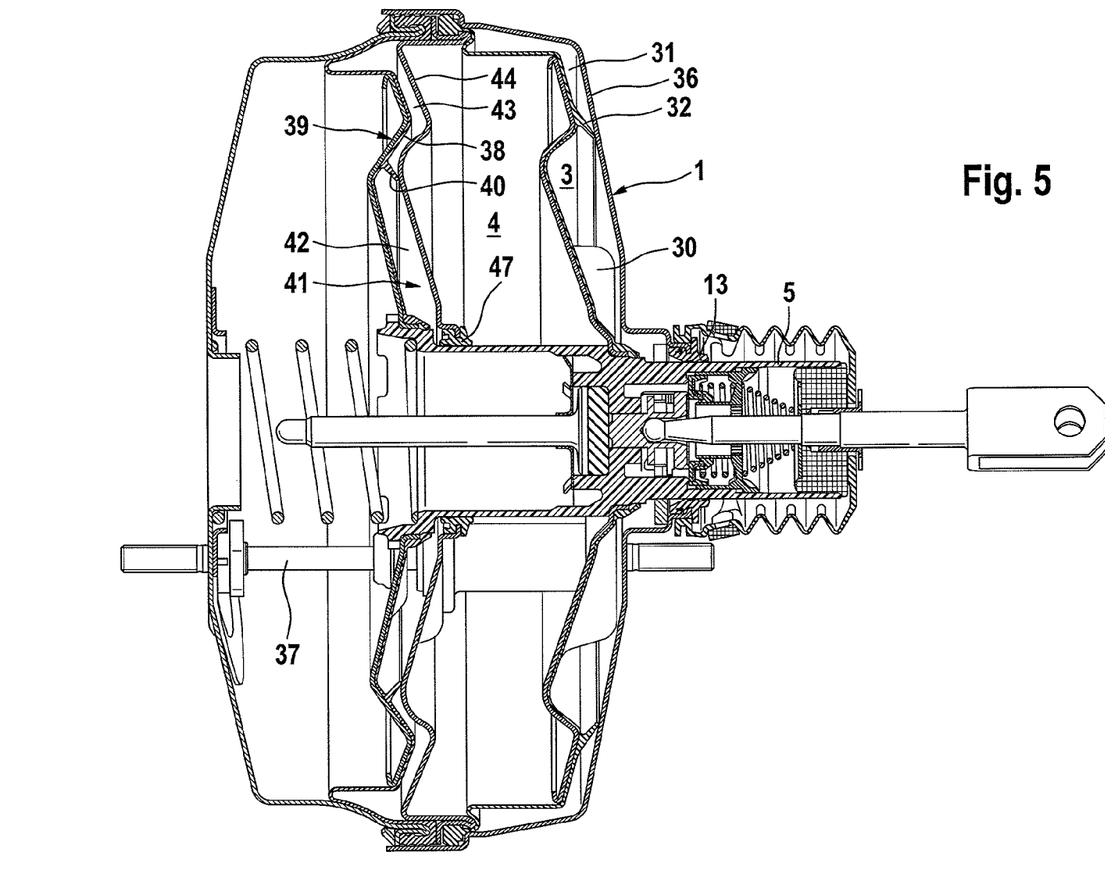
FIG. 5 shows a part view of a third exemplary embodiment of a pneumatic brake servo according to the invention.

FIG. 5 shows the third exemplary embodiment, in which the lip 32 bears against an oblique section 36 of the servo housing 1 at the beginning of actuation, with the result that the brake servo can be provided with what is known as a tie rod 37 which penetrates the servo housing 1 in the region of the flange section 35. As FIG. 5 shows, in a brake servo which is configured as a tandem unit, a second rolling diaphragm 38 of a second movable wall 39 can likewise have a circumferential lip 40 which divides a second working chamber 41 into a prechamber 42 and a main chamber 43 by bearing against an intermediate floor 44, and therefore has the same function as the lip 32. A sealing ring 47 seals the second working chamber 41 with respect to the first vacuum chamber 4.

As has already been mentioned above, the lip 32 or else the lip 40 is provided in a defined, leaky manner in the above-described exemplary embodiments, in order to make complete restoring of the brake servo into a standby position possible.

To this end, the lip 32 or 40 can have at least one rib (not shown) or one recess (not shown) which prevents sealing contact of the lip 32 or 40 with the servo housing 1 or the intermediate floor 44, as a result of which a defined leakiness of the lip 32 or 40 is ensured. As a result, the air can escape completely from the working chamber or chambers 3, 41 again during the restoring of the brake servo. A modification of the servo housing 1 is therefore advantageously unnecessary.

As an alternative, at least one channel can be provided in the servo housing 1 or in the intermediate floor 44 in the bearing region of the lip 32 or 40, which channel likewise ensures a defined leakiness.

Figure 6:
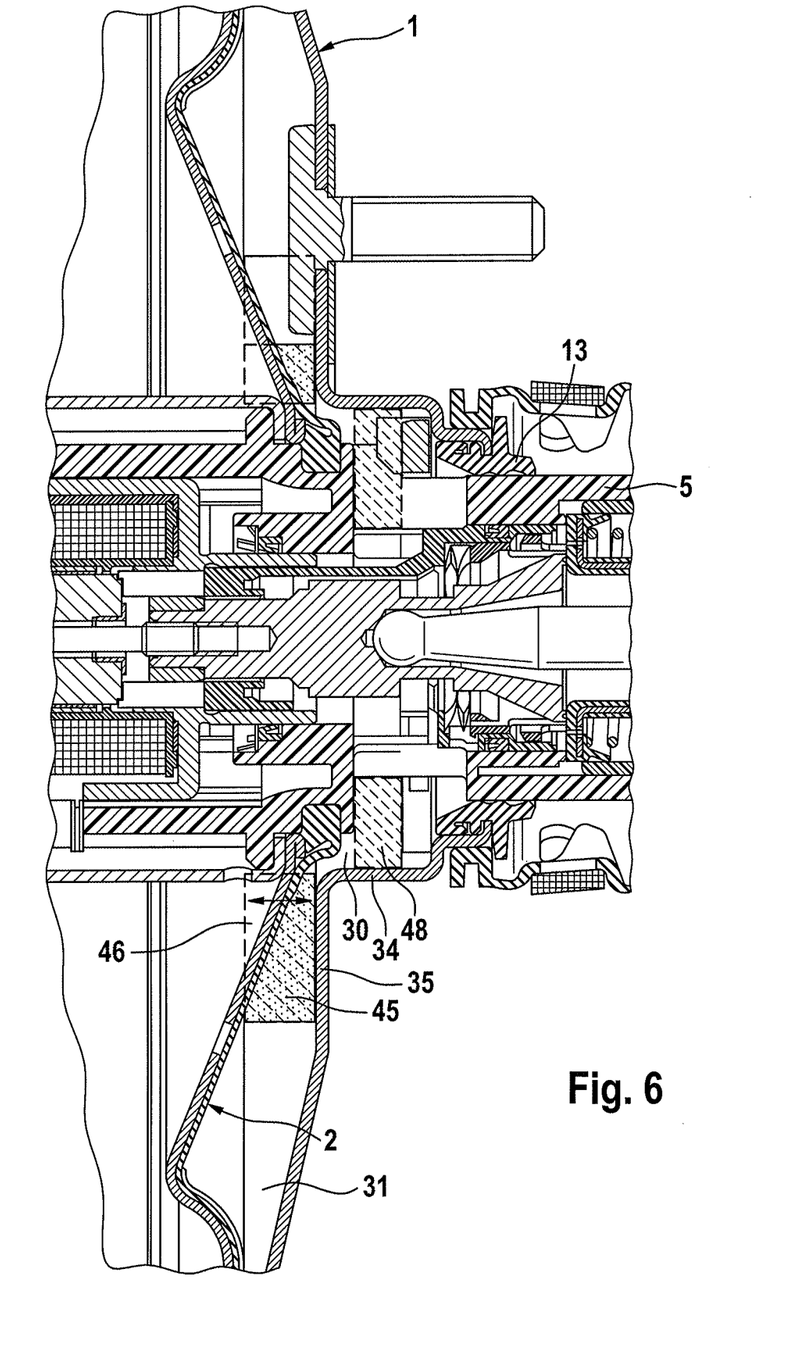
FIG. 6 shows a part view of a fourth exemplary embodiment of a pneumatic brake servo according to the invention.

FIG. 6 shows a fourth exemplary embodiment of a brake servo according to the invention. In said exemplary embodiment, a reversibly deformable, circumferential filter element 45 which ventilates the main chamber 31 in a throttled manner is provided as means. As can be seen from FIG. 6, the filter element 45 which is formed, for example, from an open-pore or closed-pore filter mat is provided on the flange section 35 of the servo housing 1, with the result that the movable wall 2 deforms the filter element 45 as shown, in the standby position shown of the brake servo. In the case of an actuation of the brake servo, the movable wall moves to the left in the drawing. Here, the filter element 45 can expand again into its initial shape 46 which is indicated using dashed lines, with the result that the working chamber 3 can be ventilated again in an unthrottled manner.

In order to ensure the defined leakiness of the filter element 45, the latter can have, for example, at least one passage channel (not shown). It is also advantageous here that no modification of the servo housing 1 is necessary.

If, according to one exemplary embodiment which is not shown, the filter element 45 is fastened to the movable wall 2, at least one channel which ensures the defined leakiness can be provided on the servo housing 1 in the bearing region of the filter element 45.

Furthermore, a fifth exemplary embodiment of a brake servo according to the invention is indicated in FIG. 6. As can be seen, the abovementioned filter element 45 can also be provided as a reversibly deformable, annular filter element 48 (indicated by dashed lines) in the region of the axial section 34 of the servo housing 1, which filter element 48 ventilates the main chamber 31 in a throttled manner. Said filter element can likewise be formed from an open-pore or closed-pore filter mat. In the case of an actuation of the brake servo, the control housing 5 moves to the left in the drawing. Here, the filter element 48 opens the complete cross section, with the result that the working chamber 3 can be ventilated again in an unthrottled manner. In addition, the filter element 48 damps disruptive noises which are caused by the air flow in the control housing 5.

In order to ensure the defined leakiness of the filter element 48, the latter can also have, for example, at least one passage channel (not shown). It is also advantageous here that no modification of the servo housing 1 is necessary.

It is therefore possible in principle within the scope of the invention to provide the above-described means both on the servo housing 1 and on the movable wall 2. Furthermore, the defined leakiness of the means can be ensured by suitable channels, ribs or recesses.

LIST OF DESIGNATIONS

1 Servo housing
2 Movable wall
3 Working chamber
4 Vacuum chamber
5 Control housing
6 Reaction disk
7 Input member
8 Diaphragm plate
9 Valve piston
10 Valve body
11 Transverse member
12 Control valve
13 Sealing ring
14 Thrust rod
15 Sealing seat
16 Sealing seat
17 Cavity
18 Rolling diaphragm
19 Passage
20 Housing opening
21 Guide part
22 Valve spring
23 Head flange
24 Annular space
25 Stop
26 Restoring spring
27 Return spring
28 Channel 29 Channel
30 Prechamber
31 Main chamber
32 Lip
33 Sealing bead
34 Section
35 Flange section
36 Section
37 Tie rod
38 Rolling diaphragm
39 Movable wall
40 Lip
41 Working chamber
42 Prechamber
43 Main chamber
44 Intermediate floor
45 Filter element
46 Initial shape
47 Sealing ring
48 Filter element
L Longitudinal axis

The invention claimed is:

1. A pneumatic brake servo for motor vehicles comprising: a servo housing, the interior of which is divided into at least one working chamber and at least one vacuum chamber by at least one axially movable wall which can be loaded with a pneumatic differential pressure, having a control valve which controls the differential pressure and is arranged in a control housing for connecting the working chamber to the vacuum chamber or to atmosphere, the movable wall comprising a diaphragm plate and a rolling diaphragm, and the working chamber being sealed by a sealing ring which bears against the control housing and which is clamped in the radial direction in relation to a longitudinal axis of the brake servo, further comprising a circumferential lip formed integrally on the rolling diaphragm, such that at the beginning of an actuation of the brake servo, the lip divides the working chamber into a prechamber and a main chamber, and following the actuation of the brake servo, the lip does not divide the working chamber into the prechamber and the main chamber.

2. The pneumatic brake servo as claimed in claim 1, wherein the means are arranged circumferentially on the servo housing, and in that, at the beginning of the actuation, the means separate the main chamber from the prechamber in a defined, leaky manner by bearing against the rolling diaphragm.

3. The pneumatic brake servo as claimed in claim 1, wherein the means are arranged in the region of an axial section of the servo housing.

4. The pneumatic brake servo as claimed in claim 1, wherein the means are arranged in the region of a radial flange section of the servo housing.

5. The pneumatic brake servo as claimed in claim 1, wherein the means are arranged in the region of an oblique section of the servo housing.

6. A pneumatic brake servo for motor vehicles comprising: a servo housing, the interior of which is divided into at least one working chamber and at least one vacuum chamber by at least one axially movable wall which can be loaded with a pneumatic differential pressure, having a control valve which controls the differential pressure and is arranged in a control housing for connecting the working chamber to the vacuum chamber or to atmosphere, the movable wall comprising a diaphragm plate and a rolling diaphragm, and the working chamber being sealed by a sealing ring which bears against the control housing and which is clamped in the radial direction in relation to a longitudinal axis of the brake servo, further comprising means, in order, at the beginning of an actuation of the brake servo, to reduce an actively loaded area of the movable wall by division of the working chamber into a prechamber and a main chamber,
wherein the means are provided in a defined, leaky manner, and
wherein a circumferential lip is formed integrally as the means on the rolling diaphragm, which circumferential lip bears against the servo housing or an intermediate floor at the beginning of actuation.

7. A pneumatic brake servo for motor vehicles comprising: a servo housing, the interior of which is divided into at least one working chamber and at least one vacuum chamber by at least one axially movable wall which can be loaded with a pneumatic differential pressure, having a control valve which controls the differential pressure and is arranged in a control housing for connecting the working chamber to the vacuum chamber or to atmosphere, the movable wall comprising a diaphragm plate and a rolling diaphragm, and the working chamber being sealed by a sealing ring which bears against the control housing and which is clamped in the radial direction in relation to a longitudinal axis of the brake servo, further comprising means, in order, at the beginning of an actuation of the brake servo, to reduce an actively loaded area of the movable wall by division of the working chamber into a prechamber and a main chamber,
wherein the means are arranged circumferentially on the rolling diaphragm or the control housing, and in that, at the beginning of the actuation, the means separate the main chamber from the prechamber in a defined, leak manner by bearing against the servo housing or an intermediate floor, and
wherein the means comprise a reversibly deformable, circumferential filter element which ventilates the main chamber in a throttled manner at the beginning of the actuation such that at the beginning of the actuation of the brake servo the filter element is in a first state of compression and following the actuation of the brake servo the filter element is in a second, lower state of compression.

* * * * *